(12) United States Patent
Bomhoff et al.

(10) Patent No.: US 7,535,832 B2
(45) Date of Patent: May 19, 2009

(54) APPARATUS AND METHOD TO SET THE SIGNALING RATE OF A SWITCH DOMAIN DISPOSED WITHIN AN INFORMATION STORAGE AND RETRIEVAL SYSTEM

(75) Inventors: Matthew D. Bomhoff, Tucson, AZ (US); Brian J. Cagno, Tucson, AZ (US); John C. Elliott, Tucson, AZ (US); Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/995,459

(22) Filed: Nov. 22, 2004

(65) Prior Publication Data

US 2006/0112249 A1 May 25, 2006

(51) Int. Cl.
*H04L 12/26* (2006.01)
(52) U.S. Cl. .................. 370/229; 370/252; 370/465
(58) Field of Classification Search .................. None
See application file for complete search history.

(56) References Cited

U.S. PATENT DOCUMENTS

| 5,596,575 | A | 1/1997 | Yang et al. | |
|---|---|---|---|---|
| 6,198,727 | B1 | 3/2001 | Wakeley et al. | |
| 6,226,269 | B1* | 5/2001 | Brewer et al. | 370/245 |
| 6,477,171 | B1 | 11/2002 | Wakeley et al. | |
| 6,732,201 | B2* | 5/2004 | Stover et al. | 710/60 |
| 6,763,417 | B2 | 7/2004 | Paul et al. | |
| 6,963,295 | B1* | 11/2005 | Greene et al. | 341/70 |
| 7,155,546 | B2* | 12/2006 | Seto | 710/100 |
| 7,177,942 | B1* | 2/2007 | Lynn et al. | 709/233 |
| 7,423,964 | B2* | 9/2008 | Bomhoff et al. | 370/229 |
| 2004/0243666 | A1* | 12/2004 | Wood | 709/202 |
| 2005/0232643 | A1* | 10/2005 | Aronson et al. | 398/183 |
| 2006/0072473 | A1* | 4/2006 | Droops et al. | 370/252 |
| 2006/0104215 | A1* | 5/2006 | Bomhoff et al. | 370/252 |

\* cited by examiner

*Primary Examiner*—Michael J Moore, Jr.
(74) *Attorney, Agent, or Firm*—Dale F. Regelman; Quarles & Brady LLP

(57) ABSTRACT

A method is disclosed to set the signaling rate of a switch domain disposed in an information storage and retrieval system. The method establishes a switch domain target operating speed, and determines if that switch domain target operating speed comprises a first signaling rate. If the switch domain target operating speed comprises a first signaling rate, then the method asserts first Device Control Code bits to each of the plurality of data storage devices, and each of the plurality of data storage devices communicates with the switch using that first signaling rate. If the switch domain target operating speed does not comprise the first signaling rate, then the method asserts second Device Control Code bits to each of the plurality of data storage devices, and each of the plurality of data storage devices communicates with the switch using a second signaling rate.

12 Claims, 17 Drawing Sheets

FIG. 6B

| DEV CTL BIT 2 (HDD) | DEV CTL BIT 1 (HDD) | DEV CTL BIT 0 (HDD) | FUNCTION |
|---|---|---|---|
| 0 | 0 | 0 | EPOW |
| 1 | 0 | 1 | 4 Gb/s |
| 0 | 0 | 0 | EPOW |
| 1 | 1 | 0 | 2 Gb/s |

APPARATUS AND METHOD TO SET THE SIGNALING RATE OF A SWITCH DOMAIN DISPOSED WITHIN AN INFORMATION STORAGE AND RETRIEVAL SYSTEM

FIELD OF THE INVENTION

This invention relates to an apparatus and method to set the signaling rate of a switch domain disposed within an information storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a write request, the system stores information received from a host computer in a data cache. In certain implementations, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

In certain embodiments, a plurality of data storage devices are interconnected via a network, where that network comprises a plurality of individual switch domains each of which comprises one or more data storage devices. What is needed is a method to set the signaling rate for each of the interconnected switch domains.

SUMMARY OF THE INVENTION

Applicants' invention comprises an apparatus and method to set the signaling rate of a switch domain disposed in an information storage and retrieval system. The method provides an information storage and retrieval system comprising a switch domain comprising a switch and a plurality of data storage devices interconnected to that switch, wherein the switch is capable of operating at a first signaling rate and at a second signaling rate, wherein the second signaling rate is greater than that first signaling rate.

The method establishes a switch domain target operating speed, and determines if that switch domain target operating speed comprises the first signaling rate. If the switch domain target operating speed comprises the first signaling rate, then the method asserts first Device Control Code bits to each of the plurality of data storage devices, and each of the plurality of data storage devices communicates with the switch using that first signaling rate.

BRIEF DESCRIPTION OF THE DRAWINGS

The invention will be better understood from a reading of the following detailed description taken in conjunction with the drawings in which like reference designators are used to designate like elements, and in which:

FIG. 6B is a table reciting settings for four sets of Device Control Code bits;

FIG. 9, comprising

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's method to initially and subsequently adjust the signaling rate of a switch domain is not meant, however, to limit Applicant's invention to data processing applications, as the invention herein can be applied to setting and adjusting switch domain signaling rates in general.

Figure 1:
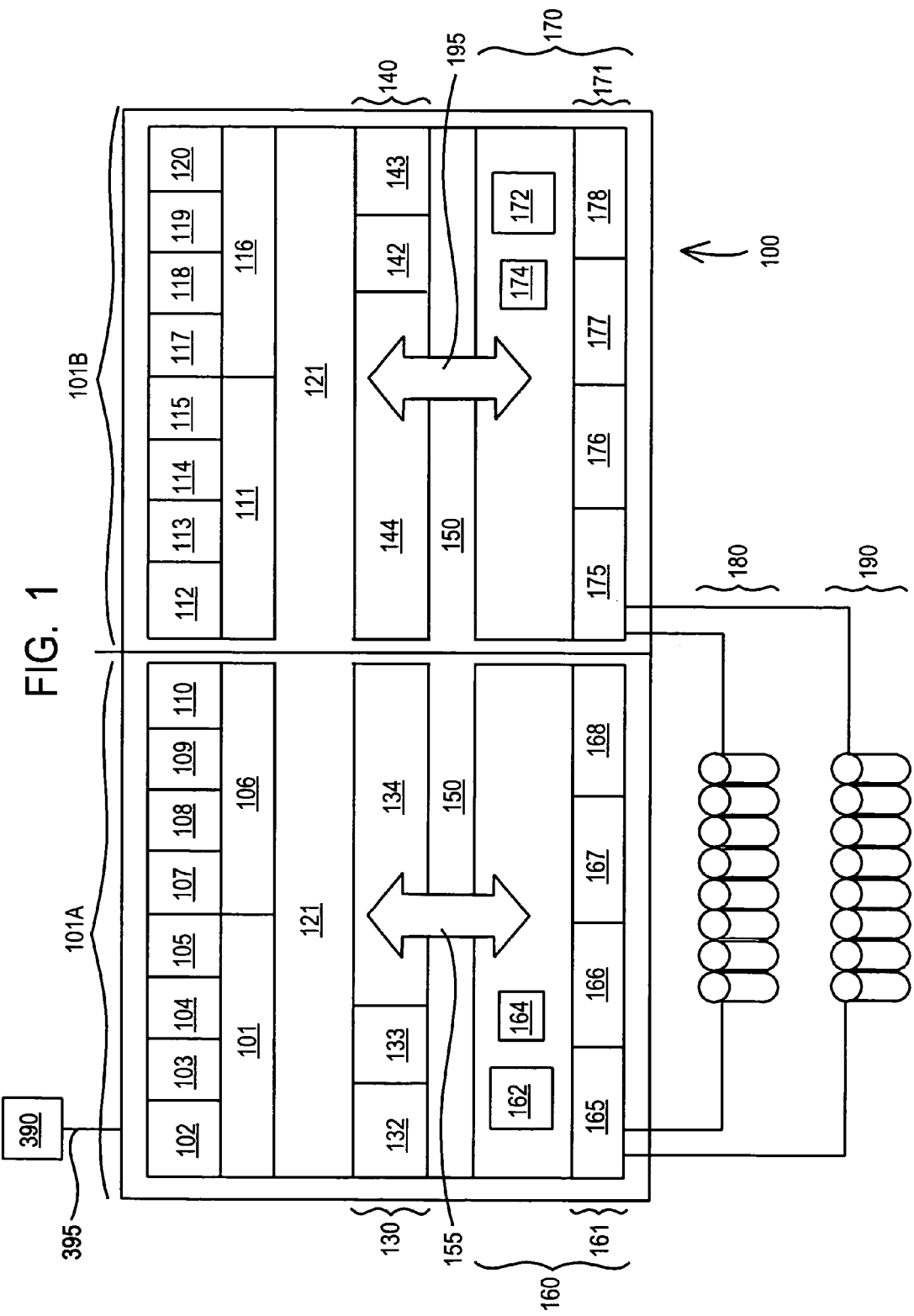
FIG. 1 is a block diagram showing a first embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapters 101A which includes adapters 102-105 and 107-110; and a second plurality of host adapters 101B which includes adapters 112-115 and 117-120. In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprise nonvolatile storage ("NVS") 172 and battery backup 174 for NVS 172.

In certain embodiments of Applicants' system, one or more host adapters 101, processor portion 130, one or more device adapters 161, and a switch 207, are disposed in a controller, such as controller 205 (FIGS. 2, 3), disposed in Applicants' information storage and retrieval system. Similarly, in certain embodiments, one or more host adapters 111, processor portion 140, one or more device adapters 171, and a switch are disposed in a second controller, such as controller 205b (FIGS. 2, 3), disposed in Applicants' information storage and retrieval system. In these embodiments, Applicants' system 100 includes two controllers interconnected to a plurality of data storage devices.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
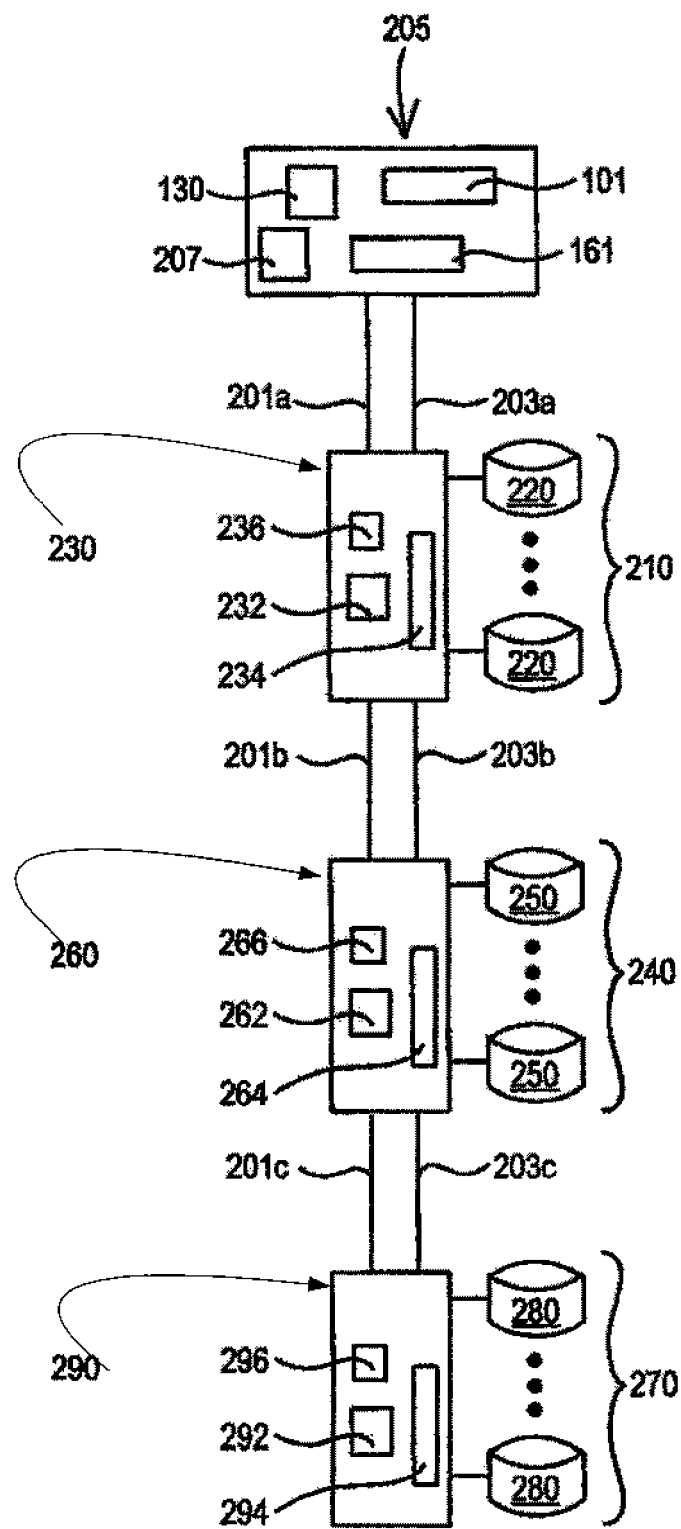
FIG. 2 is a block diagram showing a second embodiment of the data storage and retrieval system of FIG. 1 comprising three switch domains, each of which comprises one or more data storage devices.

Referring now to FIG. 2, a plurality of data storage devices 220, 250, and 280, are interconnected with system controller 205 using three switch domains. Those three switch domains include switch domain 210, switch domain 240, and switch domain 270. Each switch domain includes a switch and one or more data storage devices interconnected to that switch. Switch domain 210 comprises switch 230 and one or more data storage devices 220. Switch domain 240 comprises switch 260 and one or more data storage devices 250. Switch domain 270 comprises switch 290 and one or more data storage devices 280.

The loop structure shown in FIG. 2 comprises one embodiment of Applicant's system. In other embodiments, communication links shown in FIG. 2 comprise a switched fabric or a combination of a switch and loop topologies. In yet other embodiments and referring now to FIG. 3, Applicants' information storage and retrieval system comprises dual FC-AL loops of switches where the system controllers 205a and 205b are interconnected with two FC-AL loops. Each loop contains one or more switch domain controllers, such as switch domain controllers 310, 320, 330, 340, 350, and 360.

Each switch domain controller comprises a switch, a processor, and microcode. In certain embodiments, the switch comprises a Fibre Channel switch. In certain embodiments, the processor comprises an SES processor. For example, switch domain controllers 310, 320, 330, 340, 350, and 360, include processors 312, 322, 332, 342, 352, and 362, respectively. Similarly, switch domain controllers 310, 320, 330, 340, 350, and 360, include switches 314, 324, 334, 344, 354, and 364, respectively. In addition, switch domain controllers 310, 320, 330, 340, 350, and 360, include microcode 316, 326, 336, 346, 356, and 366, respectively.

Figure 3:
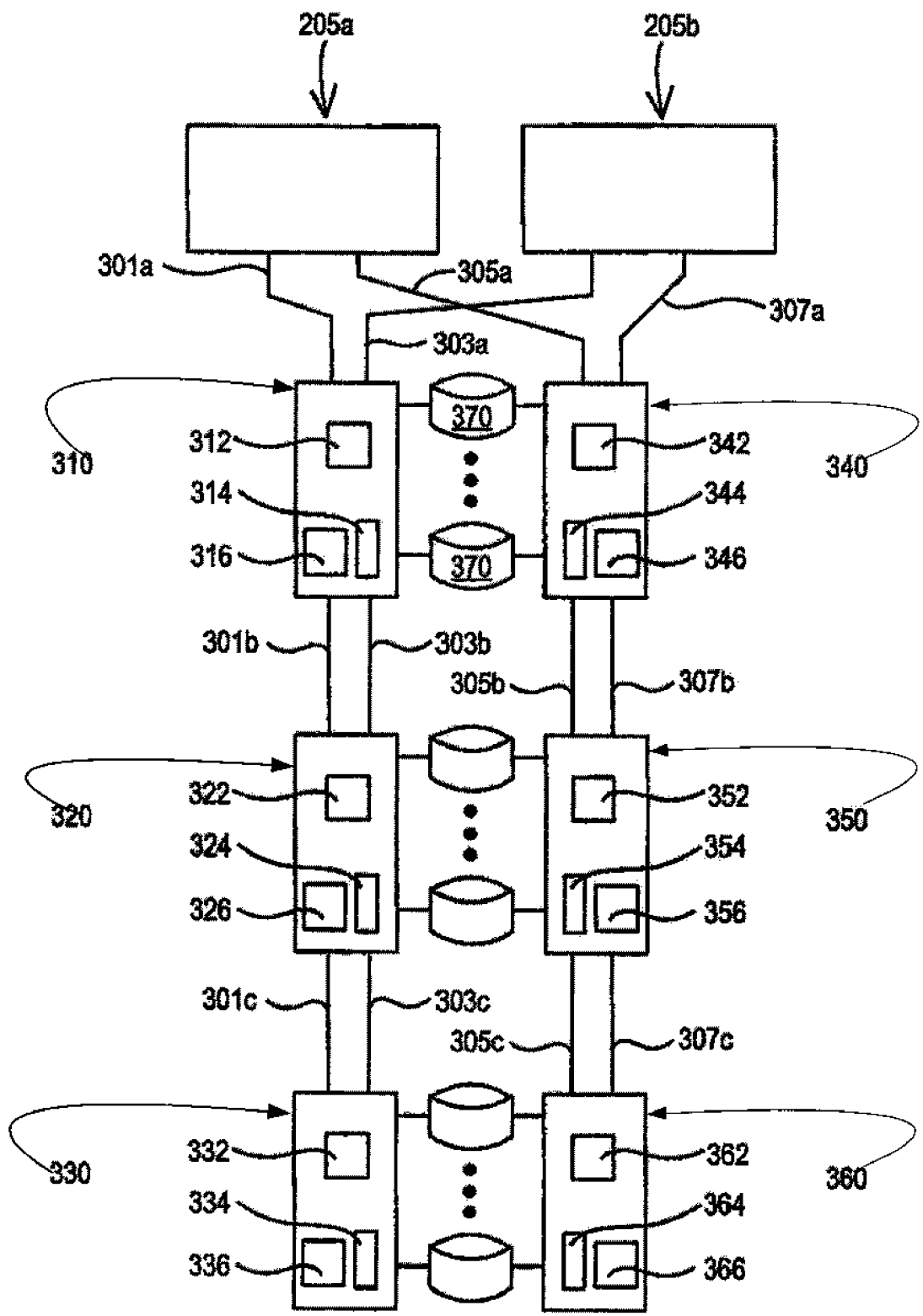
FIG. 3 is a block diagram showing a third embodiment of the data storage and retrieval system of FIG. 1 comprising six switch domains, each of which comprises one or more data storage devices.
Figure 4A:
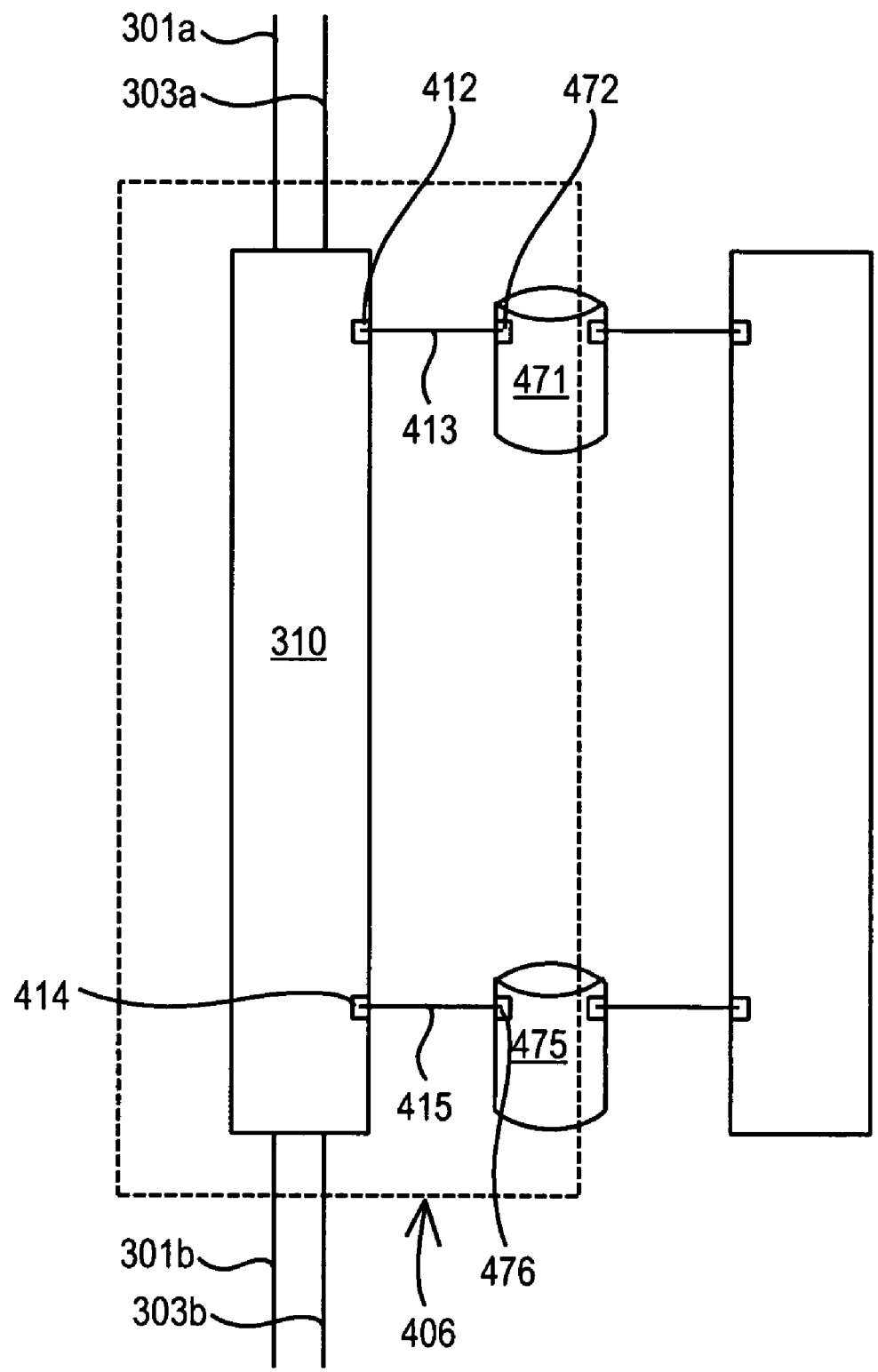
FIG. 4A is a block diagram showing a first switch domain in the data storage and retrieval system of FIG. 3.

The illustrated embodiment of FIG. 3 includes 6 switch domains. For example and referring to FIG. 4A, switch domain 406 includes switch domain controller 310 and data storage devices 471 and 475. Data storage devices 471 and 475 each comprise two I/O ports. Port 472 of data storage device 471 is interconnected with port 412 of switch domain controller 310 via communication link 413. Port 476 of data storage device 475 is interconnected with port 414 of switch domain controller 310 via communication link 415.

Figure 4B:
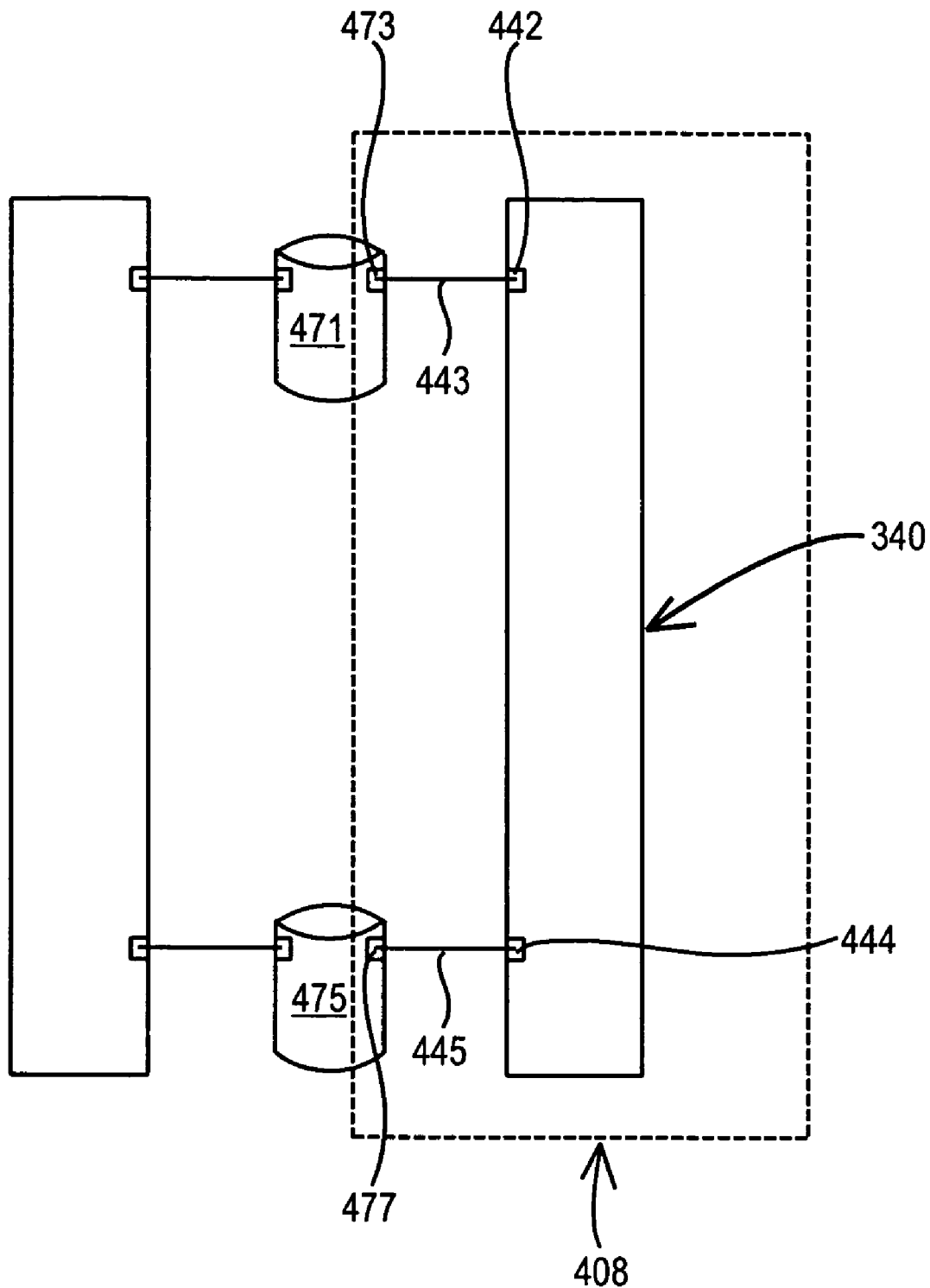
FIG. 4B is a block diagram showing a second switch domain in the data storage and retrieval system of FIG. 3.

Referring to FIG. 4B, switch domain 408 includes switch domain controller 340 and data storage devices 471 and 475. Data storage devices 471 and 475 each comprise two I/O ports. Port 473 of data storage device 471 is interconnected with port 442 of switch domain controller 340 via communication link 443. Port 477 of data storage device 475 is interconnected with port 444 of switch domain controller 340 via communication link 445.

In certain embodiments of Applicants' method, each of the two ports disposed on a data storage device must operate at the same signaling rate. For example, switch domain 406 may be capable of operating at a speed of about 4 gigabits per second. Switch domain 408 may be limited to an operating speed of about 2 gigabits per second if, for example, port 473 can support a 2 gigabit per second speed but not a 4 gigabit per second speed, even if all of the other components comprising switch domain 408 are capable of operating at about 4 gigabits per second. If switch domain 406 keeps data storage device 471 on-line and operates at 2 gigabits per second, and if switch domain 408 keeps data storage device 471 on-line, then both switch domains operate at a 2 gigabits per second signaling rate. Alternatively, if switch domain 406 takes data storage device 471 off-line, then both switch domains can operate at a 4 gigabit per second signaling rate.

Figure 5A:
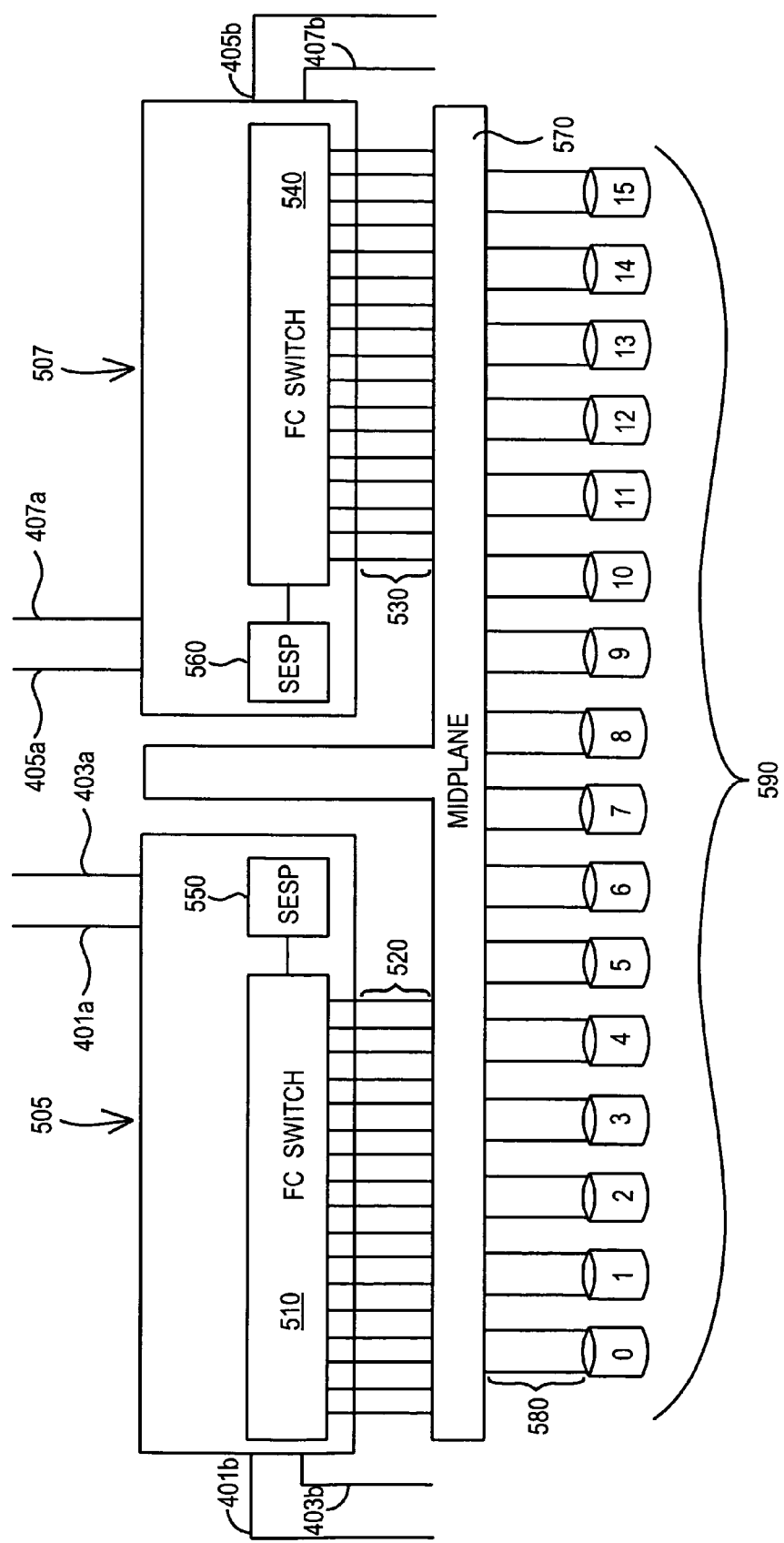
FIG. 5A is a block diagram showing a fourth embodiment of the data storage and retrieval system of FIG. 1.

In certain embodiments, Applicants' apparatus further includes a midplane interconnecting one or more controllers to one or more data storage devices. Referring now to FIG. 5A, controller 505 comprises Fibre Channel switch 510 and SES processor 550. A plurality of first communication links 520 interconnect Fibre Channel switch 510 to midplane 570. A plurality of second communication links 580 interconnect data storage devices 590 with midplane 570.

Controller 507 comprises Fibre Channel switch 540 and SES processor 560. A plurality of first communication links 530 interconnect Fibre Channel switch 540 to midplane 570.

Figure 5B:
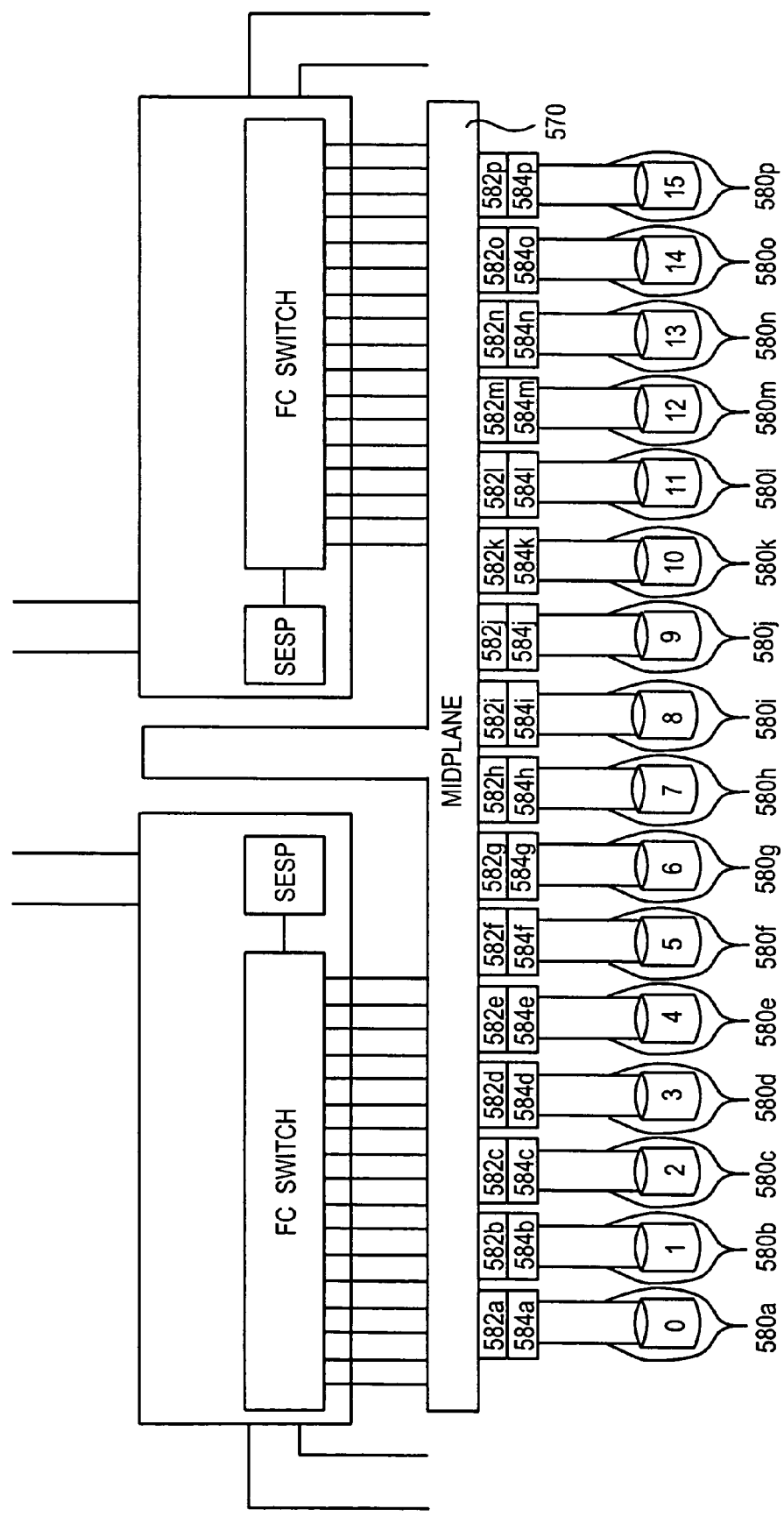
FIG. 5B is a block diagram showing SCA connectors and receptacles disposed on the midplane of FIG. 5A.

Referring now to FIG. 5B, in certain embodiments of Applicants' apparatus plurality of communication links 580 are interconnected with a plurality of Single Connector Assemblies ("SCA") 582. In certain embodiments, each SCA 582 comprises a 40 position SCA. In certain embodiments, each SCA 582 comprises an 80 position SCA. In the illustrated embodiment of FIG. 5B, data storage device 0 is interconnected with midplane 570 by plurality of communication links 580a. Plurality of communication links 580a are interconnected to SCA 582a. SCA 582a mates with SCA receptacle 584a. Similarly, data storage devices 1, 2, 3, 4, 5, 6, 7, 8, 9, 10, 11, 12, 13, 14, and 15, are interconnected with midplane 570 by plurality of communication links 580b, 580c, 580d, 580e, 580f, 580g, 580h, 580i, 580j, 580k, 580l, 580m, 580n, 580o and 580p, respectively. Plurality of communication links 580b, 580c, 580d, 580e, 580f, 580g, 580h, 580i, 580j, 580k, 580l, 580m, 580n, 580o and 580p are interconnected to SCA 582b, 582c, 582d, 582e, 582f, 582g, 582h, 582i, 582j, 582k, 582l, 582m, 582n, 582o and 582p, respectively. SCA 582b, 582c, 582d, 582e, 582f, 582g, 582h, 582i, 582j, 582k, 582l, 582m, 582n, 582o and 582p mate with SCA receptacles 584b, 584c, 584d, 584e, 584f, 584g, 584h, 584i, 584j, 584k, 584l, 584m, 584n, 584o and 584p, respectively.

Figure 5C:
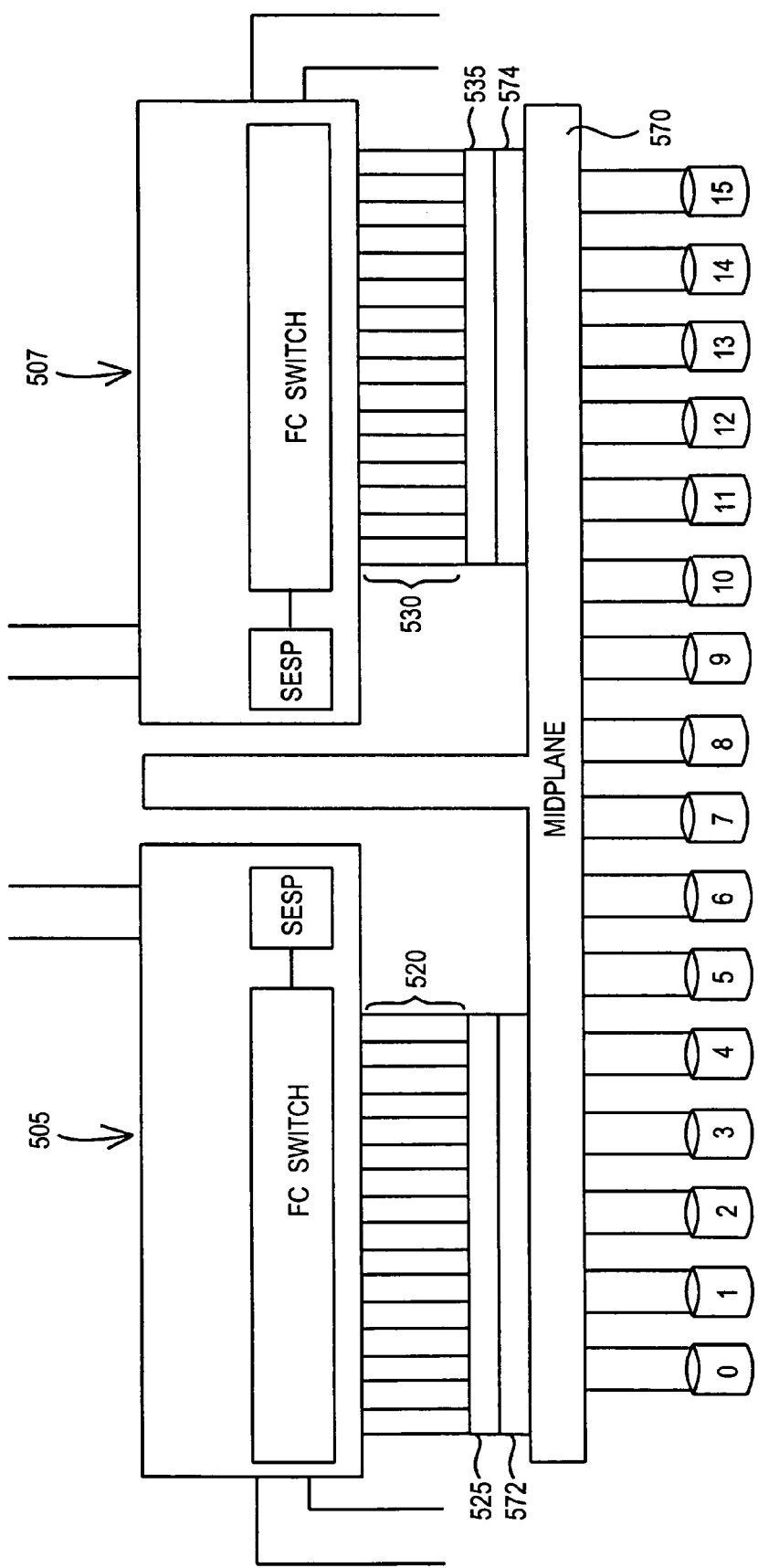
FIG. 5C is a block diagram showing first controller interconnections and second controller interconnections disposed on the midplane of FIG. 5A.

Referring to FIG. 5C, in certain embodiments midplane 570 comprises first controller interconnections 572. In certain embodiments, midplane 570 further comprises second controller interconnections 574. In certain embodiments, the controller interconnected to the first controller interconnections 572 comprises a master controller. In certain embodiments, the controller interconnected to the second controller interconnections 574 comprises a slave controller. In the illustrated embodiment of FIG. 5C, controller 505 comprises a master controller and controller 507 comprises a slave controller.

Figure 6A:
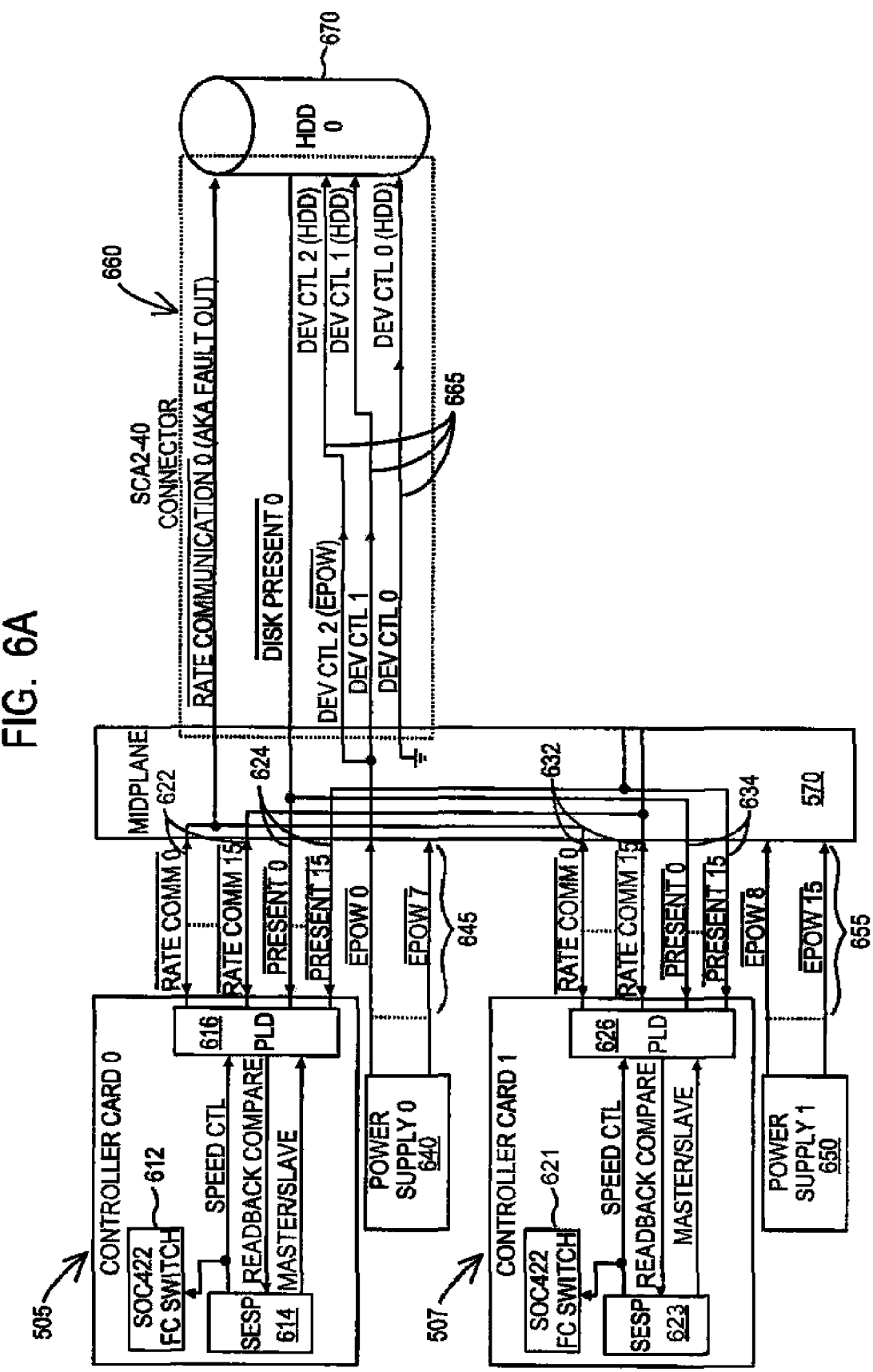
FIG. 6A is a block diagram showing additional components and certain communication links disposed in the system of FIG. 5A.

In the illustrated embodiment of FIG. 6A, controller 505 comprises FC switch 612, SES processor 614 and programmable logic device ("PLD") 616. A plurality of rate communication lines 622, and a plurality of disk present lines 624, interconnected controller 505 and midplane 570. In certain embodiments, the plurality of communication links 520 recited in FIGS. 5A and 5C comprise rate comm lines 622 and disk present lines 624.

Controller 507 comprises FC switch 621, SES processor 623, and PLD 626. A plurality of rate communication lines 632, and a plurality of disk present lines 634, interconnected controller 507 and midplane 570. In certain embodiments, the plurality of communication links 530 recited in FIG. 5 comprise rate communication lines 632 and disk present lines 634.

Power supply 640 provides power failure warning signals to backplane 570 via a plurality of communication links 645. Power supply 650 provides power failure warning signals to backplane 570 via a plurality of communication links 655.

Connector 660 interconnects data storage device 670 with midplane 570. Communication links 665 allow data storage device 670 to read three control bits, namely dev_ctl0, dev_ctl1, and dev_ctl2. Each of the plurality of data storage devices interconnected with controllers 505 and 507 are interconnected to midplane 570 via a separate connector 660.

Under Section 6.4.8 of SFF Specification 8045 (hereinafter the "Specification"), directed to the operations of a Fibre Channel data storage device, signaling rates must be implemented using discrete, non-bused control signals wired to the disk drive connector pin out, such as connector 660. In certain embodiments, connector 660 comprises a Single Connector Assembly ("SCA"). In certain embodiments, SCA 660 comprises a 40 position SCA. Using Applicants' apparatus and method, signaling rates, i.e. storage device speed, are provided using three Device Control Code bits, namely dev_ctl0, dev_ctl1, and dev_ctl2.

FIG. 6B defines various settings for these Device Control Code bits. In certain embodiments, Applicants' apparatus and method implement the optional Early Power Off Warning ("EPOW") function set forth in Section 6.4.8.2. of the Specification, entitled "Power Failure Warning." In these embodiments, Applicants' apparatus and method utilize three Device Control Code bits, i.e. dev_ctl0, dev_ctl1, and dev_ctl2, to differentiate between an EPOW signal, a 2 Gb/s signal, and a 4 Gb/s signal. For example, Device Control Code bits 602 and 606 comprise "000" and signal an imminent loss of power to the data storage devices. Device Control Code bits 604 comprise "101" and signal selection of a 4 Gb/s speed. Device Control Code bits 608 comprise "110" and signal selection of a 2 Gb/s speed.

For Applicants' information storage and retrieval system, such as system 100, to accommodate both 2 Gb/s and 4 Gb/s signaling rates using non-bused signals that are not hard-wired, but are controlled within the system, Applicants' apparatus and method dynamically senses the installed disk drive capabilities, and dynamically sets the data storage device signaling rates, as described herein.

Applicants' apparatus comprises two controllers, such as controllers 505 and 507, interconnected with a midplane, such as midplane 570, where 2 Gb/s (2G) drives as well as 4 Gb/s (4G) drives may be interconnected with that midplane. The midplane is wired/implemented such that no single point of failure exists that would cause more than one data storage device to become inoperable.

Each switch domain controller comprises a SCSI Enclosure Services Processor (SESP), such as SESP 614 in controller 505 and SESP 624 in controller 507, which manages 2G/4G drive environments. The illustrated embodiment of FIG. 6A comprises two, redundant, controllers.

Applicants' apparatus and method are compliant with Section 6.4.8.2., entitled "Power Failure Warning," of the Specification. Among other requirements, Section 6.4.8.2 mandates that an interconnected data storage device detect a transition to a Power Failure Warning Code (the "PFW Code") within 2 milliseconds of being asserted by a backplane/midplane, such as midplane 570 (FIGS. 5A, 5B, 5C, 6A, 7A). Applicants' power supplies, such as power supplies 640 and 650, generate Early Power Off Warning (EPOW) signals which are accommodated by disk enclosure design points.

Compliance with the Specification requires multiplexing of two signals on each drive, namely the Fault LED Out signal, and the Disk Present signal. Under the Specification, the Fault LED Out signal indicates specific conditions and/or states of the disk drive. Applicants' apparatus and method, however, determines this information at a higher level leaving this signal available. Applicants' apparatus and method utilize this signal as a rate communication (rate comm) line as described herein.

As shown in the illustrated embodiment of FIG. 6A, two gigabit bit per second disk drives are interconnected directly to the midplane. Device Control Code bit information is communicated directly from the midplane to the drives.

Figure 7A:
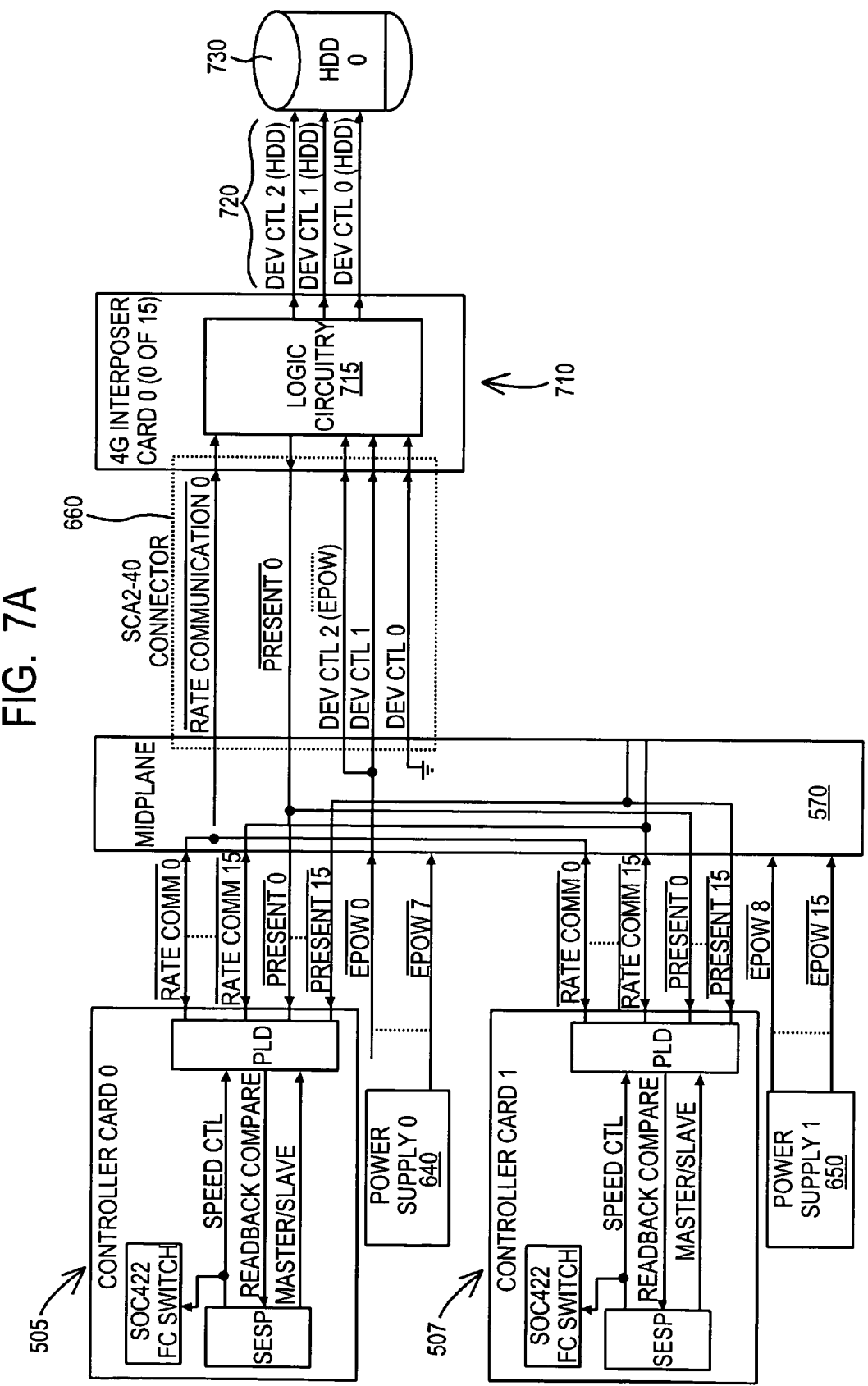
FIG. 7A is a block diagram showing an interposer card in combination with the elements of FIG. 6A.

Referring now to FIG. 7A, an interposer card 710 is disposed between each 4G data storage device, such as device 730, and the midplane, such as midplane 570. Such an interposer card comprises electronic circuitry to support multiple data storage device speeds, and the discovery and management of different signaling rates for the interconnected data storage device. The circuitry maps the normal Device Control Code bit information, intended for a standard 2G drive, to a 4G drive.

The rate communication signal for a 4G data storage device is set on the interposer. The default state of rate comm signal is low which indicates 2G operation. The master controller operates the rate communication lines to all 16 drives. These lines are used to communicate to the interposer what the desired signaling rate should be, for example 2G or 4G. The master controller obtains information from certain data registers which can be set by the system owner and/or operator, where that information indicates whether the switch domain should run at 2G or 4G.

At initial power on, the rate communication lines are low and the interposer sets speed control low to indicate 2G operation. The master controller will drive the rate communication lines to one of three frequencies, which include Freq_2G to indicate the drives should operate at 2G, Freq_4G to indicate the drives should operate at 4G, and Freq_Unlock to reset the speed control lines on the interposer cards, where Freq_2G<Freq_4G<Freq_Unlock.

Figure 7B:
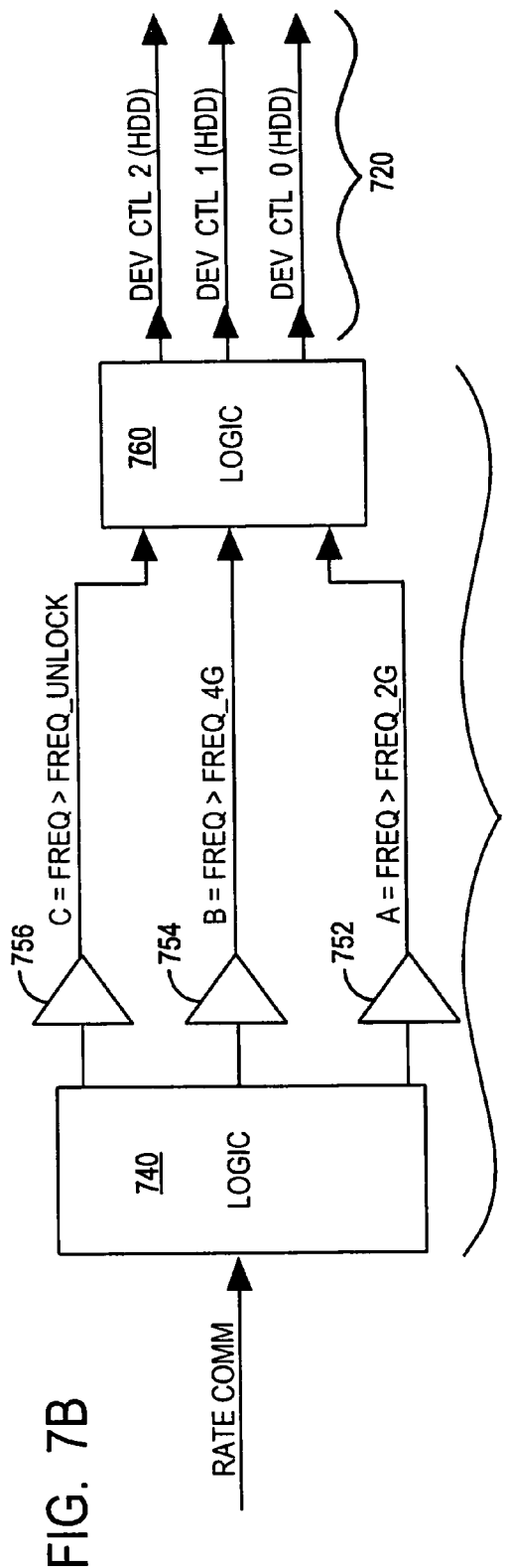
FIG. 7B is a block diagram showing certain control logic and detectors disposed on the interposer card of FIG. 7A.

Referring now to FIG. 7B, each interposer card comprises frequency detectors 752, 754, and 767, which are capable of detecting when the frequency of the rate control line is greater than Freq_2G, Freq_4G, or Freq_Unlock, respectively. In addition, the interposer card comprises logic circuitry 760 to detect the state of the frequency detectors and latch the speed control value.

Figure 7C:
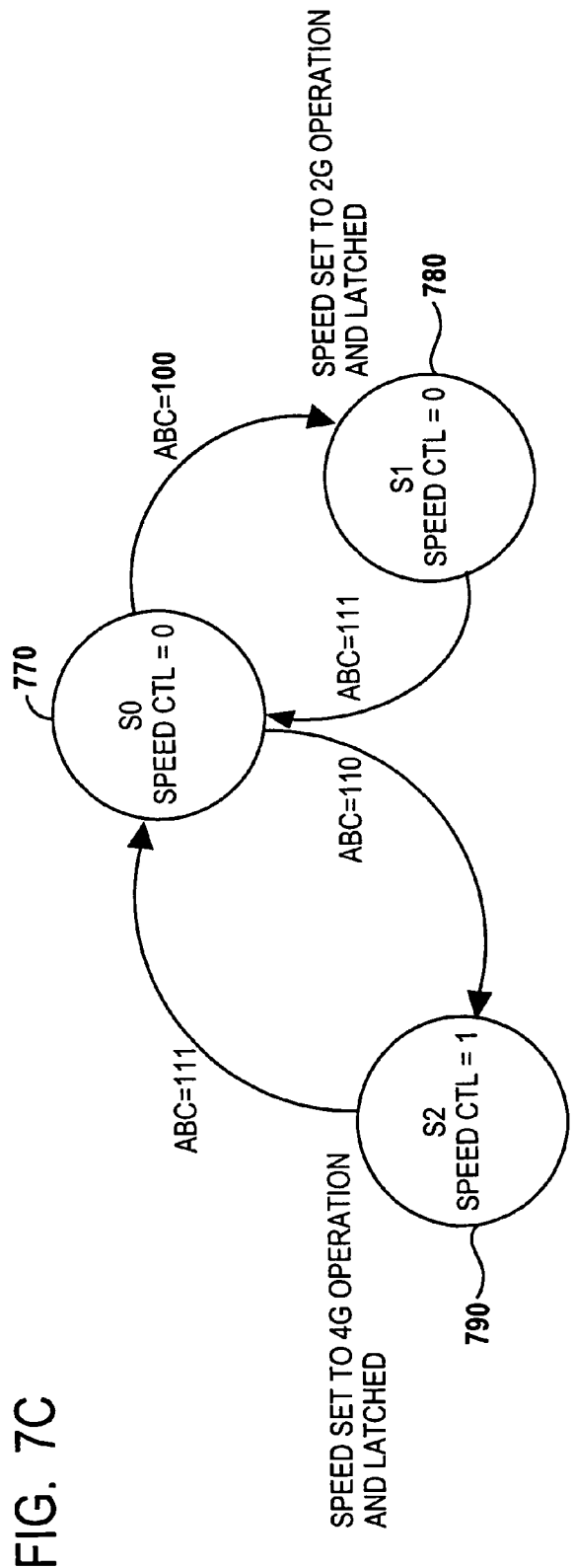
FIG. 7C is a block diagram showing three control logic states.

For example and referring now to FIG. 7C, logic state 770 comprises a state 0 wherein the speed control value is unlatched thereby allowing the signaling rate of the interconnected data storage device to be changed. If logic 760 determines that detectors 752, 754, and 756, each detect a frequency greater than Freq_2G, Freq_4G, or Freq_Unlock, respectively, i.e. logic 740 has provided a "111" signal to logic 760, then logic 760 is placed into logic state 770.

When logic 760 comprises logic state 770, if logic 760 determines that detector 752 detects a frequency greater than Freq_2G, and the detectors 754 and 756 do not detect a frequency greater than Freq_4G, or Freq_Unlock, respectively, i.e. logic 740 has provided a "100" signal to logic 760, then logic 760 provides Device Control Code bits 608 to the interconnected data storage device causing that data storage device to operate at a signaling rate of 2 Gbps.

Alternatively, if logic 760 comprises logic state 770, and if logic 760 determines that detectors 752 and 754 detect a frequency greater than Freq_2G and a frequency greater than Freq_4G, respectively, and detector 756 does not detect a frequency greater Freq_Unlock, i.e. logic 740 has provided a "110" signal to logic 760, then logic 760 provides Device Control Code bits 604 to the interconnected data storage device causing that data storage device to operate at a signaling rate of 4 Gbps.

After the rate control lines have been driven for a time interval sufficient for the interposer cards to detect the frequency and latch the speed control value, the master controller then drives the rate control lines low. The interposer cards will maintain their latched speed control value until Freq_Unlock is again detected on the rate communication line, which resets the speed control value. This prevents a possible stuck high/stuck low fault on the rate communication lines from causing the speed control values to change during normal drive operations.

Figure 8:
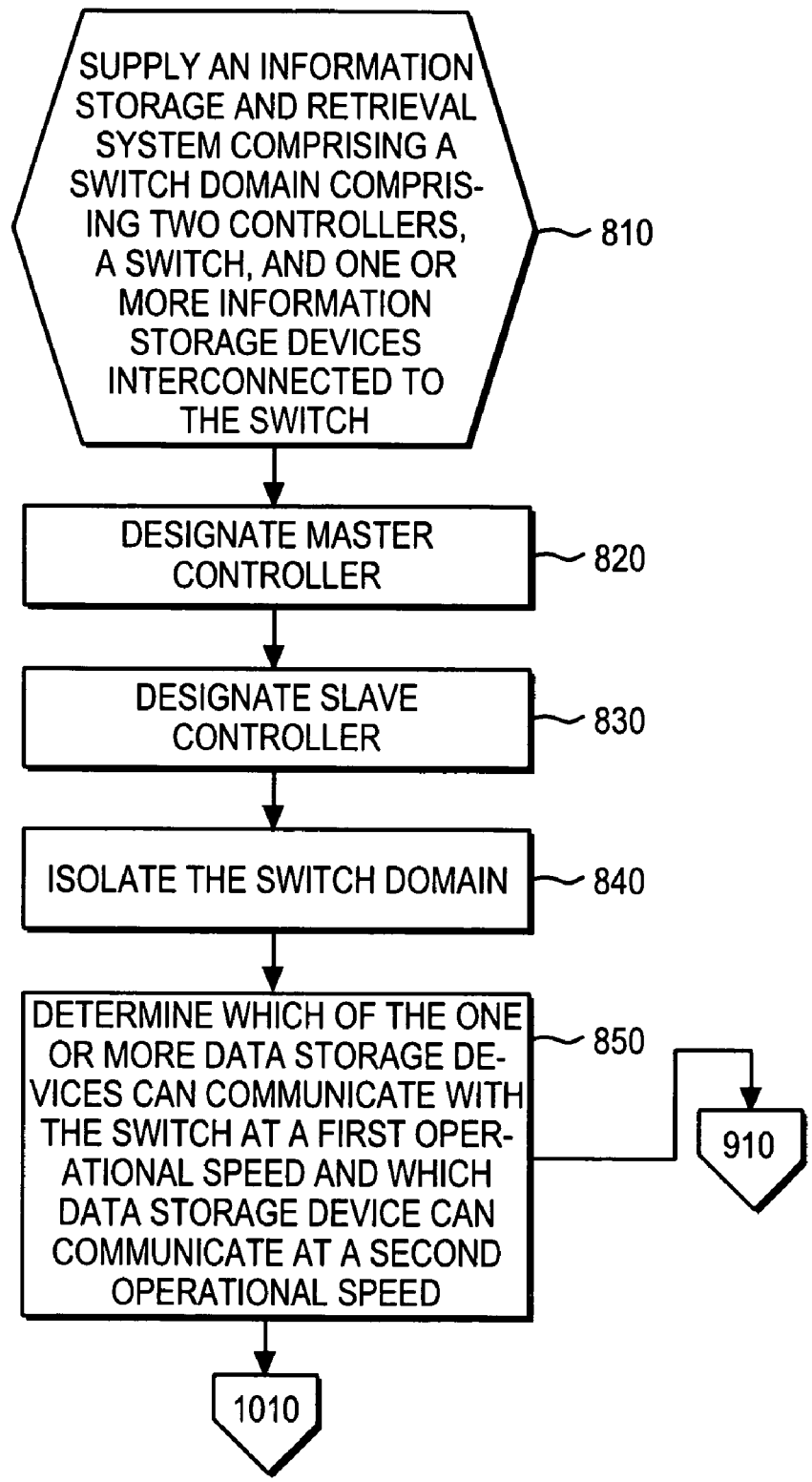
FIG. 8 is a flow chart summarizing the initial steps of Applicants' method.

Applicants' invention includes a method to set the signaling rate of a switch domain disposed within Applicants' information storage and retrieval system. Referring now to FIG. 8, in step 810 Applicants' method provides an information storage and retrieval system comprising a switch domain comprising two controllers, such as controllers 505 (FIGS. 5A, 5C, 6A, 7A) and 507 (FIGS. 5A, 5C, 6A, 7A), interconnected with a plurality of data storage devices, such as plurality of data storage devices 590.

In step 820, Applicants' method designates one of the two controllers as a master controller. In step 830, Applicants' method designated the remaining controller as a slave controller. In certain embodiments, the system of step 810 further comprises a midplane, such as midplane 570, interconnecting the two controllers and the plurality of data storage devices. In certain embodiments, that midplane comprises first interconnections, such as first interconnections 572, and second interconnections, such as second interconnections 574. In certain embodiments, the controller interconnected with the first interconnections comprises the master controller, and the controller interconnected with the second interconnections comprises a slave controller.

In step 840, Applicants' method isolates the switch domain from the remainder of the information storage and retrieval system. Referring again to FIG. 4A, to isolate switch domain 406 step 820 includes disabling communication links 301a, 301b, 303a, and 303b. In certain embodiments, step 820 is performed by a processor disposed within the switch domain.

Applicants' method transitions from step 840 to step 850 wherein the method determines which of the one or more data storage devices, such as plurality of data storage devices 590, can communicate at a first signaling rate. Step 850 further comprises determining which of the one or more data storage devices, such as plurality of data storage devices 590, can communicate at a second signaling rate. In certain embodiments, the first and/or the first signaling rate is provided by a host computer, such as host computer 390 (FIG. 1). In certain embodiments, the first and/or the second signaling rate is provided by a system controller, such as controller 205 (FIG. 2). In certain embodiments, the first and/or the second signaling rate is set in device microcode such as microcode 316 disposed in switch domain controller 310. In certain embodiments, the first and/or the second signaling rate is set in data registers disposed in Applicants' information storage and retrieval system. In certain embodiments, the first signaling rate is about 2 gigabits per second. In certain embodiments, the second signaling rate is about 4 gigabits per second.

Figure 9A:
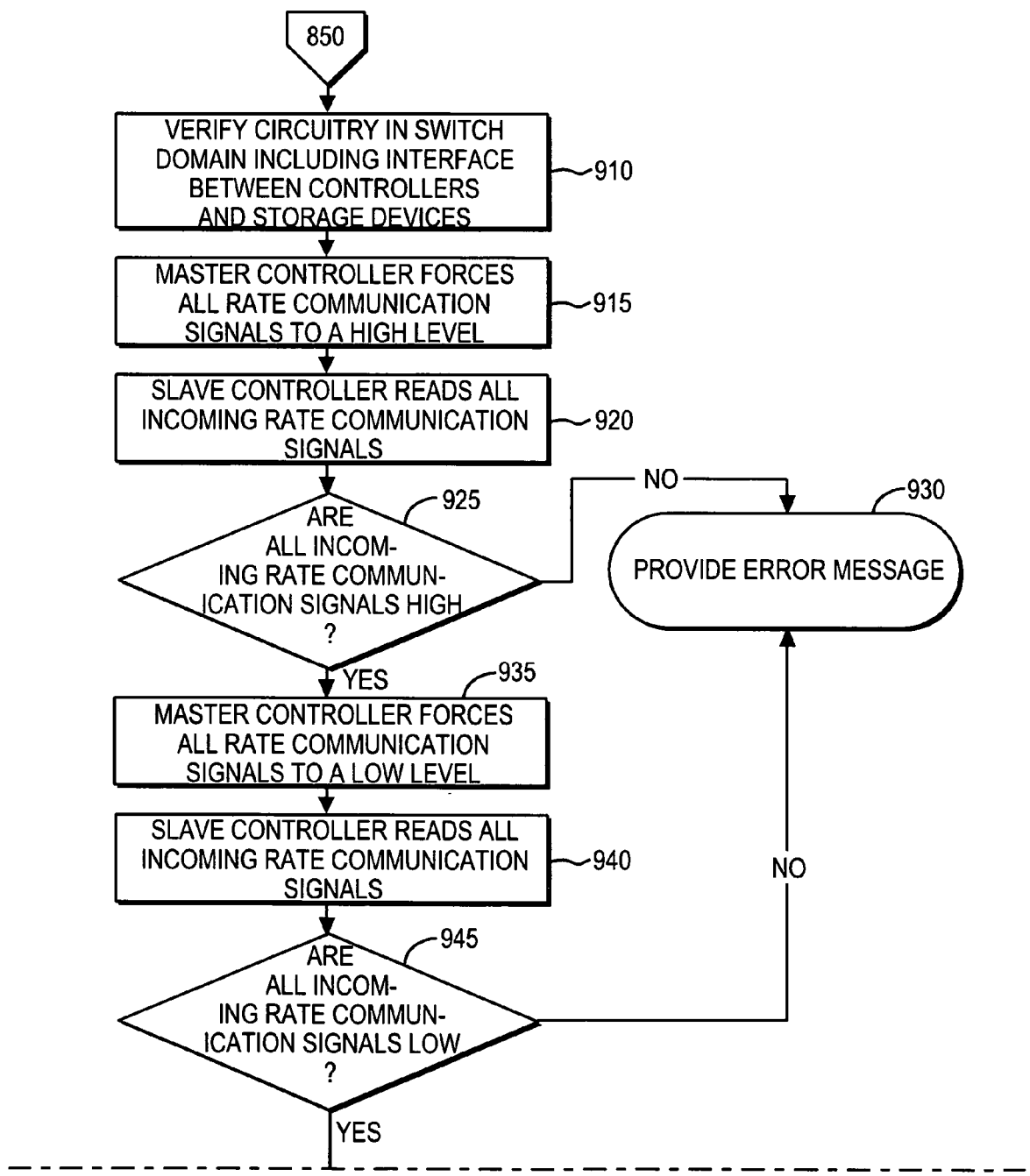
FIGS. 9A and 9B, is a flow chart summarizing certain additional steps in Applicants' method.
Figure 9B:
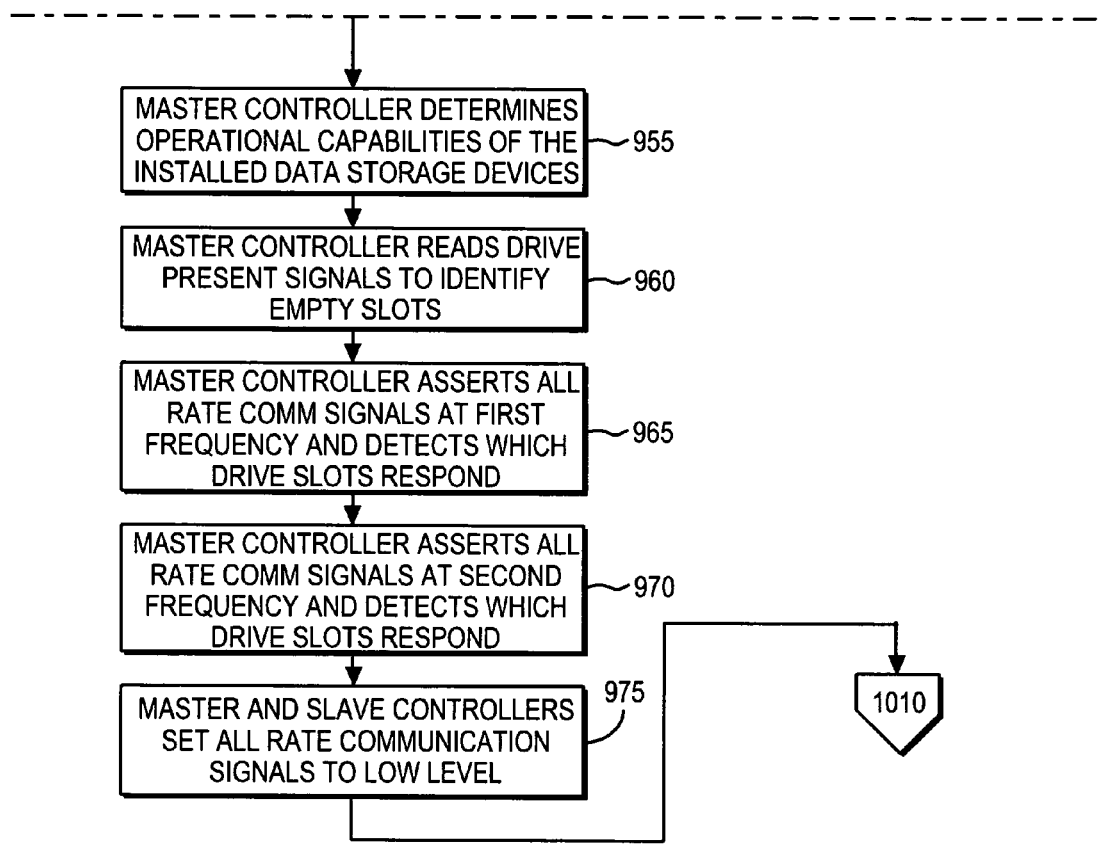

In certain embodiments, step 850 includes the steps set forth in FIGS. 9A and 9B. Referring now to FIG. 9A, in step 910 Applicants' method verifies the circuitry in the switch domain including the interface between the controllers and the data storage devices. Step 910 does not comprise determining signaling rate capabilities of the interconnected data storage devices, or setting a signaling rate for those storage devices. Rather, in certain embodiments step 910 comprises verifying the physical and electrical interconnections shown in FIGS. 6A and 7A. In certain embodiments, step 910 is performed by a master controller disposed within the switch domain.

Applicants' method transitions from step 910 to step 915 wherein the master controller forces all rate communication signals to a first level. In certain embodiments, step 915 comprises setting a first voltage on rate communication lines 622 and 632.

Applicants' method transitions from step 915 to step 920 wherein the slave controller reads all incoming rate communication signals. Applicants' method transitions from step 920 to step 925 wherein the method determines if all the incoming rate communication signals are set to a first level. In certain embodiments, step 925 comprises determining if all comm lines comprise the first voltage. In certain embodiments, step 925 is performed by the master controller. In certain embodiments, step 925 is performed by the slave controller.

If Applicants' method determines in step 925 that all the incoming rate communication signals are not set to a first level, then the method transitions from step 925 to step 930 wherein the method provides an error message. In certain embodiments, step 930 further comprises making necessary hardware and/or firmware and/or software repairs, revisions, and/or upgrades, and then restarting Applicants' method.

If Applicants' method determines in step 925 that all the incoming rate communication signals are set to a first level, then the method transitions from step 925 to step 935 wherein the master controller forces all rate communication signals to a second level. In certain embodiments, step 935 comprises setting a second voltage on rate communication lines 622 and 632, wherein the second voltage is less than the first voltage of step 915.

Applicants' method transitions from step 935 to step 940 wherein the slave controller reads all incoming rate communication signals. Applicants' method transitions from step 940 to step 945 wherein the method determines if all the incoming rate communication signals are set to a second level. In certain embodiments, step 945 comprises determining if all comm lines comprise the second voltage. In certain embodiments, step 945 is performed by the master controller. In certain embodiments, step 925 is performed by the slave controller.

If Applicants' method determines in step 945 that all the incoming rate communication signals are not set to a second level, then the method transitions from step 945 to step 930 wherein the method provides an error message. In certain embodiments, step 930 further comprises making necessary hardware and/or firmware and/or software repairs, revisions, and/or upgrades, and then restarting Applicants' method.

If Applicants' method determines in step 945 that all the incoming rate communication signals are set to a second level, then the method transitions from step 945 to step 955 (FIG. 9B) wherein the master controller determines the signaling capabilities of the interconnected data storage devices. In certain embodiments, steps 955 comprises determining, for each interconnected data storage device, if that device is rated as first signaling rate capable, second signaling rate capable, or both.

Referring now to FIG. 9B, Applicants' method transitions from step 955 to step 960 wherein the master controller reads a plurality of disk present communication links, such as communication links 624 and/or 634, to identify empty slots, i.e. SCA receptacles disposed on the midplane which are not interconnected with an SCA connector interconnected with a data storage device.

Applicants' method transitions from step 960 to step 965 wherein the master controller asserts all rate comm signals at a first frequency and detects which drive slots respond to those rate comm signals. In certain embodiments, step 965 comprises imposing a frequency of about 1 KHz on rate communication lines 622 and/or 632.

Applicants' method transitions from step 965 to step 970 wherein the master controller asserts all rate comm signals at a second frequency and detects which drive slots respond to those rate comm signals. In certain embodiments, step 970 comprises imposing a frequency of about 10 KHz on rate communication lines 622 and/or 632.

Applicants' method transitions from step 970 to step 975 wherein the master controller and the slave controller set all rate communications signals to a low level. In certain embodiments, step 975 comprises imposing said first frequency on rate communication lines 622 and 632.

After determining the speed capabilities of the plurality of data storage devices comprising the switch domain using the steps of FIG. 8 and/or the steps of FIG. 9, Applicants' method sets a switch domain signaling rate. In certain embodiments, Applicants' method utilizes the steps of FIG. 10 to set that switch domain signaling rate.

Figure 10:
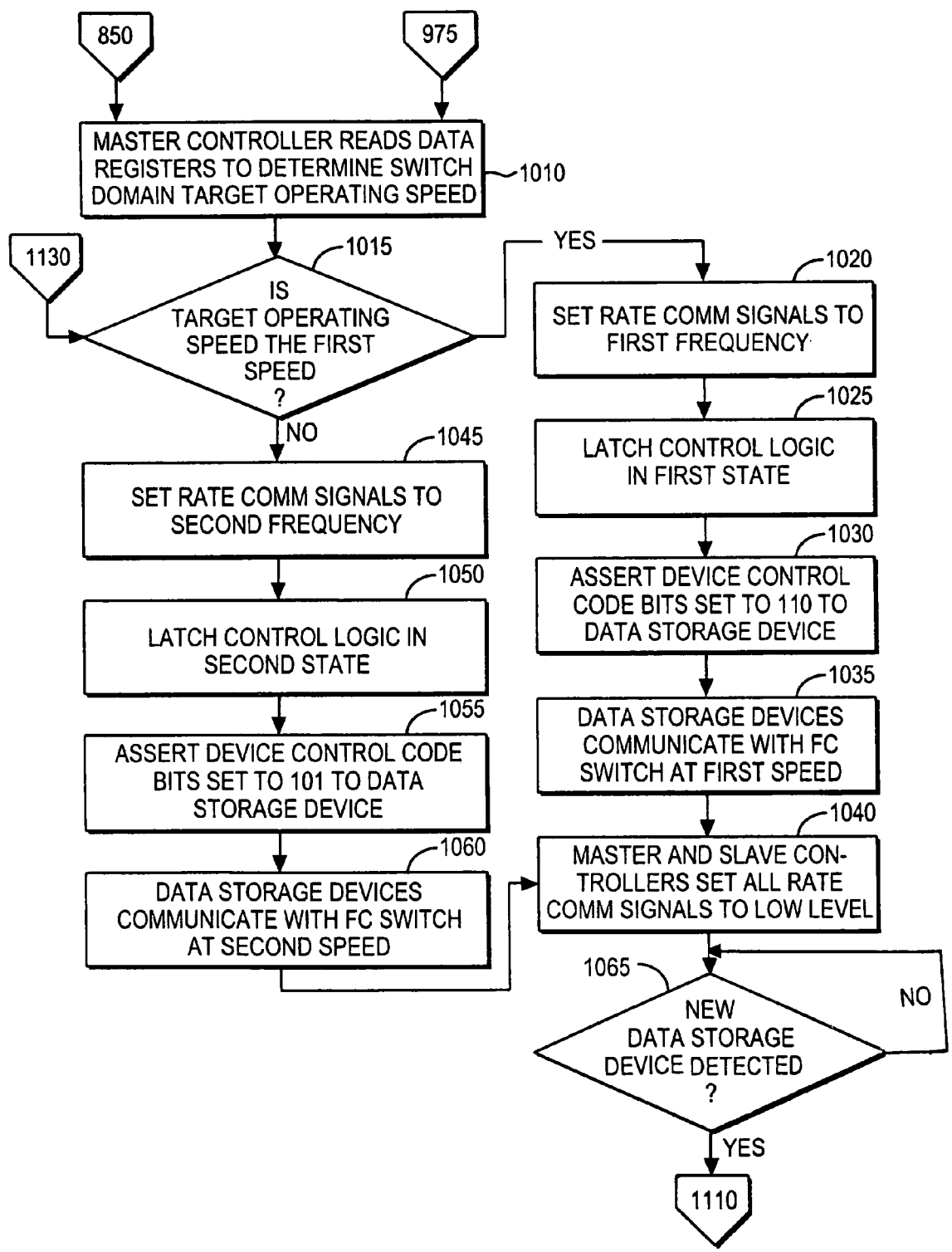
FIG. 10 is a flow chart summarizing certain additional steps in Applicants' method.

Referring now to FIG. 10, in step 1010 Applicants' method determines a switch domain target operating speed. In certain embodiments, in step 1010 the master controller reads data registers disposed in the switch domain to determine the switch domain target operating speed.

Applicants' method transitions from step 1010 to step 1015 wherein the method determines if the switch domain target operating speed comprises the first signaling rate. In certain embodiments, step 1015 is performed by the master controller.

If Applicant's method determines in step 1015 that the switch domain target operating speed comprises the first signaling rate, then the method transitions from step 1015 to step 1020 wherein the method sets a plurality of rate comm signals to a first frequency. In certain embodiments, step 1020 comprises imposing that first frequency on rate communication lines 622 and 632. In certain embodiments, step 1110 is performed by the master controller.

Applicants' method transitions from step 1020 to step 1025 wherein the method latches control logic, such as control logic 760 (FIG. 7B) in a first state, such as first state 780 (FIG. 7C). In certain embodiments, that control logic is disposed in the master controller and/or the slave controller. In certain embodiments, that logic is disposed in a PLD, such as PLD 616 and/or 626, disposed in a controller, such as controller 505 and/or 507. In certain embodiments, the control logic of step 1025 is disposed on an interposer card, such as interposer card 710.

Applicants' method transitions from step 1025 to step 1030 wherein the method asserts Device Control Code bits 608 (FIG. 6B) to each data storage device disposed in the switch domain. In certain embodiments, step 1030 is performed by the master controller and/or the slave controller. In certain embodiments, step 1030 is performed by an interposer card, such as interposer card 710.

Applicants' method transitions from step 1030 to step 1035, wherein each interconnected data storage device communicates with a switch, such as switch 510 (FIG. 5A) and/or switch 540 (FIG. 5A), or switch 612 (FIG. 6A) and/or switch 621 (FIG. 6A), disposed in the switch domain at the first signaling rate.

In certain embodiments, step 1035 is compliant with Section 6.4.6 of the Specification such that each drive shall wait a minimum of 250 msec after detecting one of the mated controls and verify the DEV CTRL CODE signals have not changed for 5 msec before accepting the link rate. If the value on DEV_CTRL_CODE_2-0 is not a supported link rate, the drive remains in the bypassed state on the FC ports. The drive continues to read the DEV_CTRL_CODE signals waiting for a supported value. After the drive reads a supported link rate value on the DEV_CTRL_CODE signals, it shall read the DEV_CTRL_CODE signals at least once a second to determine if a change of link rate is requested. When a drive reads a different link rate, it shall wait at least 30 msecs to deskew the new value before accepting the value as valid. If the new value is still present at the end of the deskew period, the drive shall perform the equivalent of a power-on-reset and attempt to operate at the new link rate.

Applicants' method transitions from step 1035 to step 1040 wherein each controller disposed in the switch domain sets all the rate communication signals to a low level.

If Applicants' method determines in step 1015 that the switch domain target operating speed is not the first signaling rate, then the method transitions from step 1015 to step 1045 wherein the method sets a plurality of rate comm signals to a second frequency. In certain embodiments, step 1045 comprises imposing that second frequency on rate communication lines 622 and 632. In certain embodiments, step 1045 is performed by the master controller.

Applicants' method transitions from step 1045 to step 1050 wherein the method latches control logic, such as control logic 760 (FIG. 7B) in a second state, such as second state 790 (FIG. 7C). In certain embodiments, that control logic is disposed in the master controller and/or the slave controller. In certain embodiments, that logic is disposed in a PLD, such as PLD 616 and/or 626, disposed in a controller, such as controller 505 and/or 507. In certain embodiments, the control logic of step 1050 is disposed on an interposer card, such as interposer card 710.

Applicants' method transitions from step 1050 to step 1055 wherein the method asserts Device Control Code bits 604 (FIG. 6B) to each data storage device disposed in the switch domain. In certain embodiments, step 1055 is performed by the master controller and/or the slave controller. In certain embodiments, step 1055 is performed by an interposer card, such as interposer card 710.

Applicants' method transitions from step 1055 to step 1060, wherein each interconnected data storage device communicates with a switch, such as switch 510 (FIG. 5A) and/or switch 540 (FIG. 5A), or switch 612 (FIG. 6A) and/or switch 621 (FIG. 6A), disposed in the switch domain at the first signaling rate.

Applicants' method transitions from step 1060 to step 1040 and continues as described herein. In certain embodiments, one or more of the plurality of data storage devices, such as devices, comprise "hot pluggable" devices such that hot pluggable devices may be installed during operation of the switch domain. In the event one or more data storage devices are installed in the switch domain while that switch domain is operational, Applicants' method in step 1065 detects those one or more newly-installed data storage devices.

If Applicants' method detects in step 1065 a newly-installed device, then the method transitions from step 1065 to step 1110 wherein the method determines the signaling capabilities of the newly installed device(s). In certain embodiments, step 1110 comprises determining, for each newly-installed data storage device, if that device is rated as first signaling rate capable, second signaling rate capable, or both. In certain embodiments, step 1110 is performed by the master controller.

Applicants' method transitions from step 1110 to step 1120 wherein the master controller asserts all rate comm signals at a first frequency and detects which drive slots respond to those rate comm signals. In certain embodiments, step 1120 comprises imposing a frequency of about 1 KHz on rate communication lines 622 and/or 632. Because Applicants' control logic associated with the pre-existing data storage devices was latched in a first state in step 1025, or latched in a second state in step 1050, those pre-existing data storage devices do not respond to the first frequency of step 1120.

Applicants' method transitions from step 1120 to step 1130 wherein the master controller asserts all rate comm signals at a second frequency and detects which drive slots respond to those rate comm signals. In certain embodiments, step 1130 comprises imposing a frequency of about 10 KHz on rate communication lines 622 and/or 632. Because Applicants' control logic associated with the pre-existing data storage devices was latched in a first state in step 1025, or latched in a second state in step 1050, those pre-existing data storage devices do not respond to the second frequency of step 1130.

Applicants' method transitions from step 1130 to step 1015 and continues as described herein.

A storage services provider providing information storage services to one or more storage services customers using Applicants' apparatus and method can provide those storage services customers enhanced time effective services which include writing information to one or more data storage devices, and/or reading data from one or more data storage devices.

The embodiments of Applicants' method recited in FIGS. 8, 9, 10, and/or 11, may be implemented separately. Moreover, in certain embodiments, individual steps recited in FIGS. 8, 9, 10, and/or 11, may be combined, eliminated, or reordered.

Figure 11:
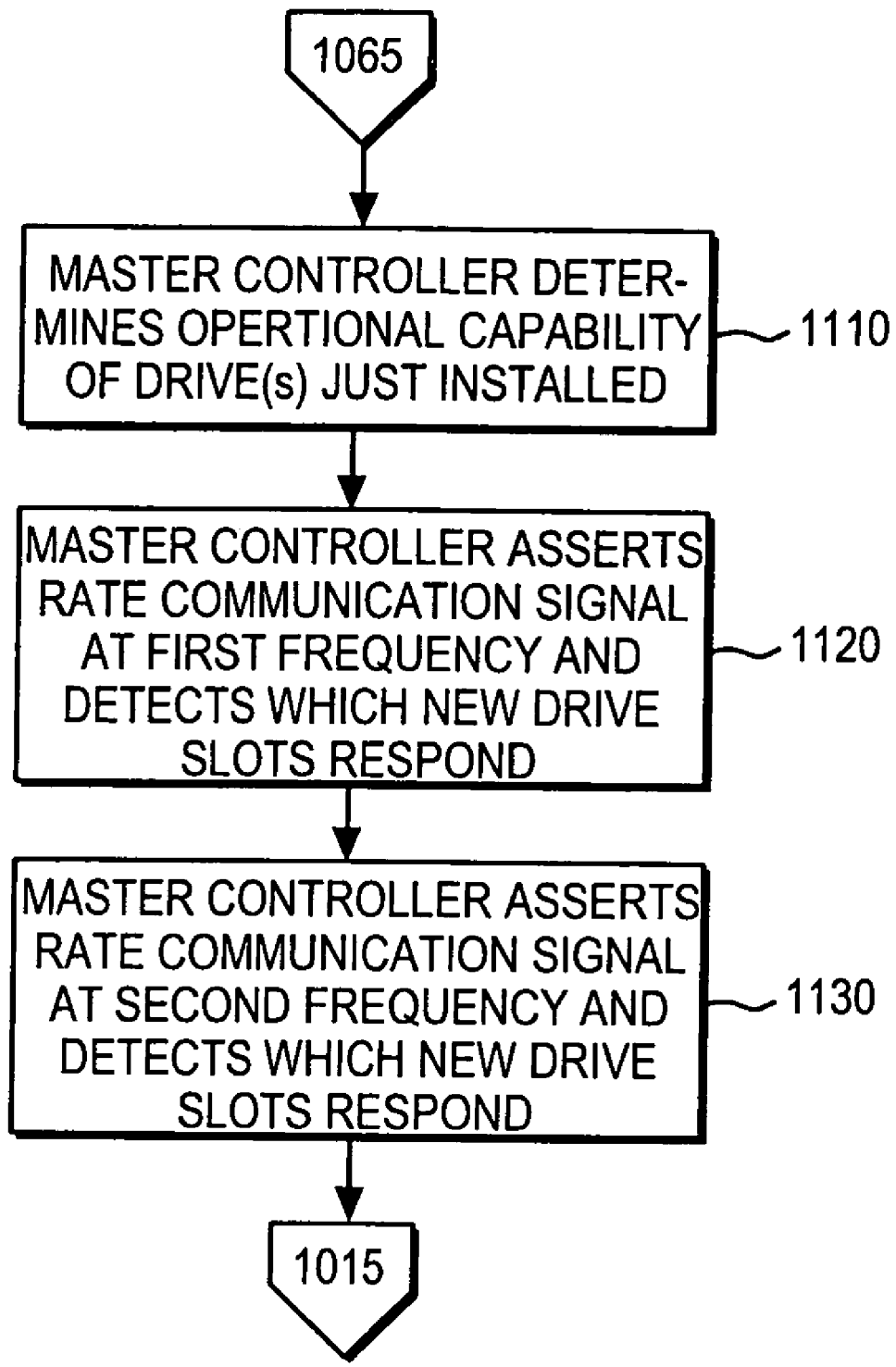
FIG. 11 is a flow chart summarizing certain additional steps in Applicants' method.

In certain embodiments, Applicants' invention includes instructions residing in microcode, such as for example microcode 316 (FIG. 3), where those instructions are executed by a switch domain processor, such as processor 312 (FIG. 3), to perform steps 820, 830, 840, and/or 850, recited in FIG. 8, and/or steps 910, 915, 920, 925, 930, 935, 940, 945, 955, 960, 965, 970, and/or 975, recited in FIG. 9, and/or steps 1010, 1015, 1020, 1025, 1030, 1035, 1040, 1045, 2050, 1055, 1060, and/or 1065, recited in FIG. 10, and/or steps 1110, 1120, and/or 1130, recited in FIG. 11.

In other embodiments, Applicants' invention includes instructions residing in any other computer program product, where those instructions are executed by a computer external to, or internal to, system 100, to perform steps 820, 830, 840, and/or 850, recited in FIG. 8, and/or steps 910, 915, 920, 925, 930, 935, 940, 945, 955, 960, 965, 970, and/or 975, recited in FIG. 9, and/or steps 1010, 1015, 1020, 1025, 1030, 1035, 1040, 1045, 2050, 1055, 1060, and/or 1065, recited in FIG. 10, and/or steps 1110, 1120, and/or 1130, recited in FIG. 11. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to set a signaling rate of a switch domain disposed in an information storage and retrieval system, comprising the steps of:

supplying an information storage and retrieval system comprising a switch domain comprising a switch, two controllers, a plurality of data storage devices interconnected to said switch, a plurality of rate communication lines, wherein a different one of said plurality of rate communication lines interconnects each data storage device with one or both of said controllers, wherein said switch is capable of operating at a first signaling rate and at a second signaling rate, wherein said second signaling rate is greater than said first signaling rate;

verifying the physical and electrical interconnections between said controllers and said plurality of data storage devices;

designating a master controller;

designating a slave controller;

providing by said master controller a rate communication signal set to a first level on each of said plurality of rate communication lines;

reading by said slave controller each of said plurality of rate communication lines;

determining if each of said plurality of rate communication lines is set to said first level;

if each of said plurality of rate communication lines is not set to said first level, generating an error message;

if each of said plurality of rate communication lines is set to said first level, providing by said master controller a rate communication signal set to a second level on each of said plurality of rate communication lines;

reading by said slave controller each of said plurality of rate communication lines;

determining if each of said plurality of rate communication lines is set to said second level;

if each of said plurality of rate communication lines is not set to said second level, generating an error message;

if each of said plurality of rate communication lines is set to said second level, determining whether each of said plurality of data storage devices is first signaling rate capable, second signaling rate capable, or both first and second signaling rate capable;

establishing a switch domain target operating speed;

determining if said switch domain target operating speed comprises said first signaling rate;

if said switch domain target operating speed comprises said first signaling rate;

asserting first Device Control Code bits to each of said plurality of data storage devices;

communicating by each of said plurality of data storage devices with said switch using said first signaling rate.

2. The method of claim 1, wherein said supplying step further comprises supplying a switch domain comprising a midplane comprising a plurality of interconnections receptacles, and a plurality of disk present lines, wherein a different data storage device is interconnected to a different one of said interconnection receptacles, and wherein a different one of said plurality of disk present lines interconnects a different one of said plurality of data storage devices and one or both of said controllers, further comprising the step of reading each of said plurality of disk present lines; and identifying empty interconnections receptacles.

3. The method of claim 1, further comprising the steps of:

asserting on each of said plurality of rate communication lines a first frequency;

detecting which of said plurality of data storage devices respond to said first frequency;

asserting on each of said plurality of rate communication lines a second frequency;

detecting which of said plurality of data storage devices respond to said second frequency.

4. The method of claim 3, further comprising the steps of:

detecting one or more newly-installed data storage devices;

asserting on each of said plurality of rate communication lines a first frequency;

detecting which of said one or more newly-installed data storage devices respond to said first frequency;

asserting on each of said plurality of rate communication lines a second frequency;

detecting which of said one or more newly-installed data storage devices respond to said second frequency.

5. An article of manufacture comprising a switch and a plurality of data storage devices interconnected to said switch, two controllers, a plurality of rate communication lines, wherein a different one of said plurality of rate communication lines interconnects each data storage device with one or both of said controllers, and a computer useable medium having computer readable program code disposed therein to set the signaling rate between said switch and said plurality of data storage devices, wherein said switch is capable of operating at a first signaling rate and at a second signaling rate, wherein said second signaling rate is greater than said first signaling rate, the computer readable program code comprising a series of computer readable program steps to effect:

verifying the physical and electrical interconnections between said controllers and said plurality of data storage devices;

designating a master controller;

designating a slave controller providing by said master controller a rate communication signal set to a first level on each of said plurality of rate communication lines;

reading by said slave controller each of said plurality of rate communication lines;

determining if each of said plurality of rate communication lines is set to said first level;

operative if each of said plurality of rate communication lines is not set to said first level, generating an error message operative if each of said plurality of rate communication lines is set to said first level:

providing by said master controller a rate communication signal set to a second level on each of said plurality of rate communication lines;

reading by said slave controller each of said plurality of rate communication lines;

determining if each of said plurality of rate communication lines is set to said second level;

operative if each of said plurality of rate communication lines is not set to said second level, generating an error message;

if each of said plurality of rate communication lines is set to said second level, determining whether each of said plurality of data storage devices is first signaling rate capable, second signaling rate capable, or both first and second signaling rate capable;

determining a switch domain target operating speed;

determining if said switch domain target operating speed comprises said first signaling rate;

operative if said switch domain target operating speed comprises said first signaling rate;

asserting first Device Control Code bits to each of said plurality of data storage devices;

communicating by each of said plurality of data storage devices with said switch using said first signaling rate.

6. The article of manufacture of claim 5, wherein said article of manufacture further comprises a midplane comprising a plurality of interconnections receptacles, and a plurality of disk present lines, wherein a different data storage device is interconnected to a different one of said interconnection receptacles, and wherein a different one of said plurality of disk present lines interconnects a different one of said plurality of data storage devices and one or both of said controllers, said computer readable program code further comprising a series of computer readable program steps to effect:

reading each of said plurality of disk present lines; and identifying empty interconnection receptacles.

7. The article of manufacture of claim 5, said computer readable program code further comprising a series of computer readable program steps to effect:

asserting on each of said plurality of rate communication lines a first frequency;

detecting which of said plurality of data storage devices respond to said first frequency;

asserting on each of said plurality of rate communication lines a second frequency;

detecting which of said plurality of data storage devices respond to said second frequency.

8. The article of manufacture of claim 7, said computer readable program code further comprising a series of computer readable program steps to effect:

detecting one or more newly-installed data storage devices;

asserting on each of said plurality of rate communication lines a first frequency;

detecting which of said one or more newly-installed data storage devices respond to said first frequency;

asserting on each of said plurality of rate communication lines a second frequency;

detecting which of said one or more newly-installed data storage devices respond to said second frequency.

9. A computer program product encoded in an information storage medium and usable with a programmable computer processor to set the signaling rate of a switch domain disposed within an information storage and retrieval system, said switch domain comprising a switch, a plurality of data storage devices interconnected to said switch, two controllers and a plurality of rate communication lines, wherein a different one of said plurality of rate communication lines interconnects each data storage device with one or both of said controllers, wherein said switch is capable of operating at a first signaling rate and at a second signaling rate, wherein said second signaling rate is greater than said first signaling rate, comprising:

computer readable program code which causes said programming computer processor to verify the physical and electrical interconnection between said controllers and said plurality of data storage devices;

computer readable program code which causes said programmable computer processor to designate a master controller; and computer readable program code which cause said programmable computer processor to designate a slave controller;

computer readable program code which causes said programmable computer processor to provide by said master controller a rate communication signal set to a first level on each of said plurality of rate communication lines;

computer readable program code which causes said programmable computer processor to read by said slave controller each of said plurality of rate communication lines;

computer readable program code which causes said programmable computer processor to determine if each of said plurality of rate communication lines is set to said first level;

computer readable program code which, if each of said plurality of rate communication lines is not set to said first level, causes said programmable computer processor to generate an error message computer readable program code which, if each of said plurality of rate communication lines is set to said first level, causes said programmable computer processor to:

provide by said master controller a rate communication signal set to a second level on each of said plurality of rate communication lines;

read bY said slave controller each of said plurality of rate communication lines;

determine if each of said plurality of rate communication lines is set to said second level;

computer readable program code which, if each of said plurality of rate communication lines is not set to said second level, causes said programmable computer processor to generate an error message;

computer readable program code which, if each of said plurality of rate communication lines is set to said second level, causes said programmable computer processor to determine whether each of said plurality of data storage devices is first signaling rate capable, second signaling rate capable, or both first and second signaling rate capable;

computer readable program code which causes said programmable computer processor to determine a switch domain target operating speed;

computer readable program code which causes said programmable computer processor to determine if said switch domain target operating speed comprises said first signaling rate;

computer readable program code which, if said switch domain target operating speed comprises said first signaling rate, causes said programmable computer processor to:

assert first Device Control Code bits to each of said plurality of data storage devices; communicate by each of said plurality of data storage devices with said switch using said first signaling rate.

10. The computer program product of claim 9, wherein said switch domain further comprises a midplane comprising a plurality of interconnection receptacles, and a plurality of disk present lines, wherein a different data storage device is interconnected to a different one of said interconnection receptacles, and wherein a different one of said plurality of disk present lines interconnects a different one of said plurality of data storage devices and one or both of said controllers, further comprising:

computer readable program code which causes said programmable computer processor to read each of said plurality of disk present lines; and computer readable program code which causes said programmable computer processor to identify empty interconnection receptacles.

11. The computer program product of claim 9, further comprising:

computer readable program code which causes said programmable computer processor to assert on each of said plurality of rate communication lines a first frequency;

computer readable program code which causes said programmable computer processor to detect which of said plurality of data storage devices respond to said first frequency;

computer readable program code which causes said programmable computer processor to assert on each of said plurality of rate communication lines a second frequency;

computer readable program code which causes said programmable computer processor to detect which of said plurality of data storage devices respond to said second frequency.

12. The computer program product of claim 11, further comprising:

computer readable program code which causes said programmable computer processor to detect one or more newly-installed data storage devices;

computer readable program code which causes said programmable computer processor to assert on each of said plurality of rate communication lines a first frequency;

computer readable program code which causes said programmable computer processor to detect which of said one or more newly-installed data storage devices respond to said first frequency;

computer readable program code which causes said programmable computer processor to assert on each of said plurality of rate communication lines a second frequency;

computer readable program code which causes said programmable computer processor to detect which of said one or more newly-installed data storage devices respond to said second frequency.

* * * * *